2 Sheets—Sheet 1.
B. BROWER & J. F. ADAMS.
Said ADAMS Assignor to said BROWER.
Temporary Binder.
No. 8,277. Reissued June 11, 1878.
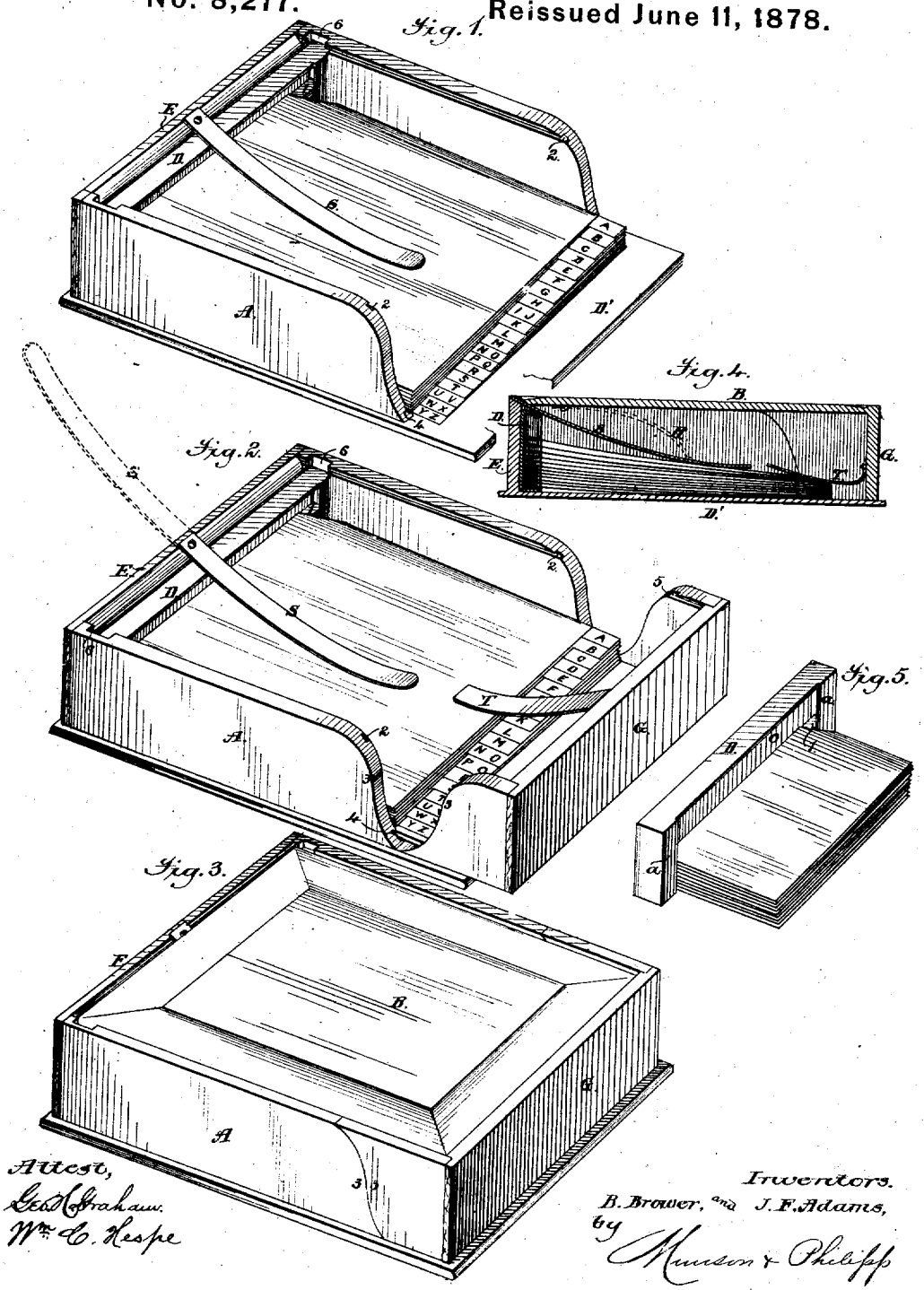
Attest,
Geo. H. Graham.
Wm. C. Hespe
Inventors.
B. Brower, and J. F. Adams,
by Munson & Philipp
Attorneys B. BROWER & J. F. ADAMS. 2 Sheets—Sheet 2.
Said ADAMS Assignor to said BROWER.
Temporary Binder.
No. 8,277. Reissued June 11, 1878.
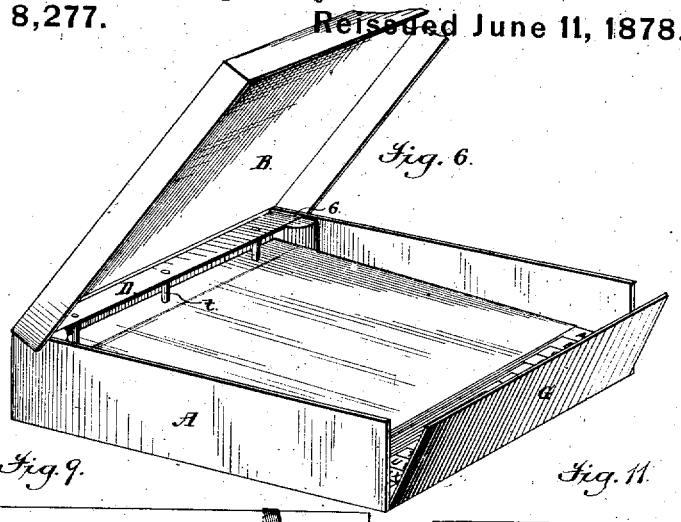
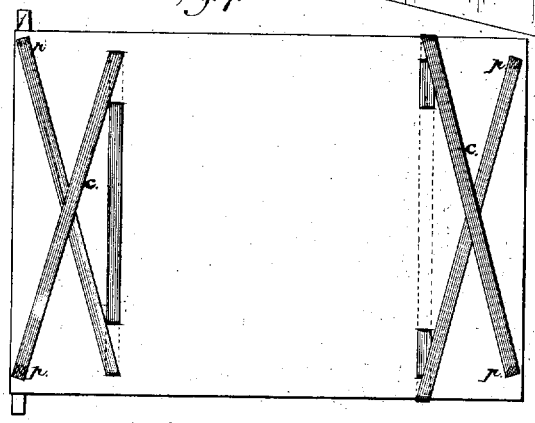
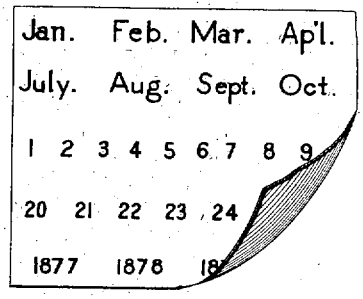
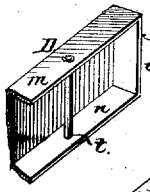
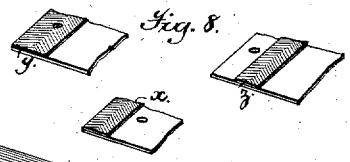
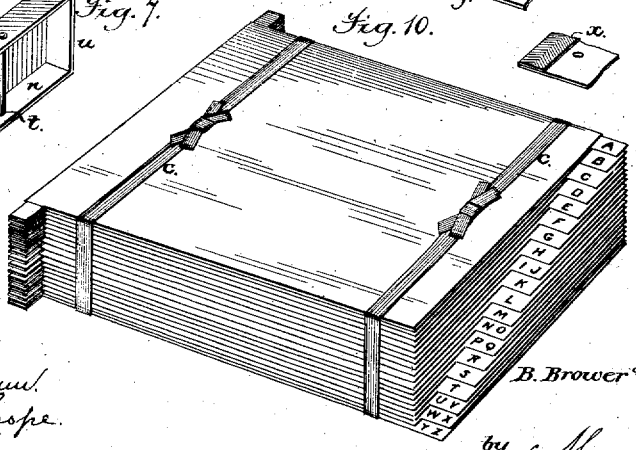
Attest,
Geo. H. Graham.
Wm. C. Hespe.
Inventors.
B. Brower and J. F. Adams,
by Munson & Philipp
Attorneys.

UNITED STATES PATENT OFFICE.

BLOOMFIELD BROWER, OF NEW YORK, N. Y., AND JOHN F. ADAMS, OF IRVINGTON, N. Y.; SAID ADAMS ASSIGNOR TO SAID BROWER.

IMPROVEMENT IN TEMPORARY BINDERS.

Specification forming part of Letters Patent No. 192,109, dated June 19, 1877; Reissue No. 8,277, dated June 11, 1878; application filed March 4, 1878.

*To all whom it may concern:*

Be it known that we, BLOOMFIELD BROWER, of the city, county, and State of New York, and JOHN F. ADAMS, of Irvington, Westchester county, New York State, have invented certain new and useful Improvements in Permanent Letter-Files, of which the following is a full, clear, and exact description.

This invention consists, primarily, in a letter-file providing index-leaves adjustable in a binding back, to permit the introduction between them of loose sheets, letters, &c., which back is independently removable from a holder, said parts constituting a permanent letter-file. Other features are, however, embodied in the invention, as will fully hereinatter appear.

In the drawings illustrating this invention is shown, in Figure 1, a perspective view of the holder with its cover removed; Fig. 2, a perspective view of the holder with its cover introduced under the index-leaves; Fig. 3, a perspective view of the file complete—that is, with its cover in a closed position; Fig. 4, a longitudinal section thereof; Fig. 5, a perspective view of the back, in which are bound the index-leaves; Fig. 6, a perspective view of a modification of the holder, also showing a modification of the back and the method of binding the index-leaves therein; Fig. 7, a perspective view of a modification of the binding-back; Fig. 8, perspective views of index-leaves, showing different modes of strengthening their binding-edges; Fig. 9, a plan view of one of the index-leaves, showing a binding cord or tape by which the index-leaves may be tied up in a package when removed from their holder; Fig. 10, a perspective view of the index-leaves when tied up in a pack or bundle; and Fig. 11, a plan view of a supplemental index.

A is a box or holder, having an open top and end, and B is a cover for the same, which, as shown in Figs. 1, 2, and 3 of the drawings, may slide in grooves 2 4, near the top and bottom of the sides of the holder, and, as shown in Fig. 6, is hinged to the holder, the front of the latter also being hinged and capable of dropping down when the cover is raised. When this cover is slidden in the grooves 2 the bottom D′ may enter the grooves 5 in its sides, the ends of which latter and the sides of the box being curved to conform to each other, as shown in Fig. 3 of the drawings, and thus close the holder, forming a box. When this cover is withdrawn from the grooves 2 it may be slidden in the grooves 4, as shown in Fig. 2 of the drawings.

The binding-back D consists of a narrow rectangular box with an open front, in which binding-back the index-leaves are secured by such means as will permit their free vertical movements, as will presently be more fully described.

This binding-back is of such dimensions in width, length, and height as to permit its introduction into the recesses 6, formed in the sides of the holder A. When thus introduced it will rest against the back E of the holder A, and the index-leaves will lie out flat in said holder, and rest upon its bottom plate. The said leaves and their binding-back may thus be removed and introduced vertically into the holder.

A spring, S, pivoted to the upper edge of the back E, is adapted to protrude into the holder and bear upon the index-leaves and compress them therein, and may be swung around, as is seen by the dotted lines in Fig. 2.

Thus constructed, the file may be used as follows: By swinging the spring S sidewise or slightly raising the same a letter or other sheet may be placed loosely between any two of the index-leaves, when, upon returning the spring to its former position, or, if it has been raised, releasing it, its resiliency will cause it to press upon and hold the index-leaves securely in place.

When such a number of loose sheets have been introduced as fill the index-leaves to their fullest capacity, (it being understood that the attaching strips 1, by which they are held in the binding-back, as in Fig. 1, permit them to separate and expand to a size nearly equal to the height of the sides of the holder,) the spring S may be swung so as to clear all vertical obstruction to the binding-back, which, together with the index-leaves and their contents, may then be removed bodily, as in Fig 10, and a new binding-back with its index leaves introduced.

In ordinary business transactions considerable time is consumed in filling one of these files, and, therefore, in order to adapt them to receive additions from time to time and permit reference to be readily made to their current contents, as well as to provide their contents with a protection from dust, the sliding cover may be introduced in the lower grooves 4, as before explained, and a spring, T, which is pivoted to its front piece, G, placed in the position shown in Fig. 2, where it bears upon the front edges of the index-leaves, holding them in place as the thickness of the index-leaves is increased by the introduction of the filed papers. This spring so used is not herein claimed; but when this cover is used to close up the holder, as in Fig. 3, this spring may be swung upon its pivot, so as to occupy the position shown in Fig. 4, where it compresses the index-leaves and prevents the matter filed between them from being disturbed by any movement imparted to the holder, and when so used it is herein claimed, and it is obvious that when it is so used the spring S may be omitted.

Instead of the springs S and T, spring R (shown in dotted lines, Fig. 4) may be attached to the bottom of the cover B, and when used serves to press down the index-leaves and any matter, such as letters or sheets, between them, securely, when the cover closes the holder. It is obvious that when it is employed the springs S and T may be omitted.

The index-leaves (shown in Sheet 1) have flexible rods or plates 1 affixed to their back edges, which rods or plates are prolonged beyond the side edges of the index-leaves, and may be sprung into the recesses formed between the side plates *a o* of the binding-back D, in which recesses they are free to move up and down, according as the index-leaves are separated by the matter introduced between them.

In this structure, of course, the plate *o*, like the plate *a*, may be quite narrow, though the latter is required to be so made to accommodate the index-leaves.

The binding-back (shown in Fig. 7) is an open frame-work, preferably of metal, consisting of top and bottom plates *m n*, end plates *u*, and sheet-supporting rods *t*. (See Figs. 6 and 7.)

The index-leaves are perforated near their back edges and strung upon these rods *t*, which are fastened in place in the plates *m n*.

As the papers filed between these index-leaves accumulate they, of course, raise said leaves upward, and as it is important that the binding or back edges of the leaves shall rise bodily and not jam or bend at their ends, they may be provided with a stiffening material, which not only renders said edges stiff and rigid, but imparts a strength thereto which will resist any strain which may be exerted upon their points of attachment. In Fig. 8 three examples of this are shown, *x* representing a strip of wood or similar rigid material, attached to the index-leaf at the rear of its point of attachment. *y* illustrates a similar strip, perforated by the attaching-holes. *z* indicates a similar strip, placed in front of the attaching-points. These strips may be secured to the leaves in any approved manner.

When the set of index-leaves filled with filed matter and held together by the binding-back is removed bodily from the holder, it is important that the free front edges of its leaves shall be secured together. This may be done, of course, by a binding-strap of any form; but it is desirable that the file shall comprise in itself all the necessary adjuncts to its perfect operation from being held conveniently for the reception of loose papers from time to time to its being removed and tied or bundled up for storage. A binding cord or band, *c*, is therefore attached to one of the outer leaves, preferably by being threaded through the same, and the free ends of this cord or band are temporarily fastened down by any means (paste *p* being adopted as convenient) which will prevent them from becoming tangled or interfering with the file until they are needed for binding up the same. When the leaves are removed from the holder, the ends of this binding-band are detached, and the said band is made to envelop the package, as in Fig. 10. One or more such bands may be employed.

As it sometimes occurs that the user of such files desires a different index, or requires some change in the one attached to the leaves, this file is furnished with a supplementary index, as in Fig. 11, temporarily attached to some part of the file, and gummed upon its back ready for use.

What, therefore, is claimed is—

1. A letter-file consisting of a holder having vertical recesses, as 6, and a series of leaves held in a binding-back which is capable of introduction and removal vertically from said holder, substantially as described.

2. The detachable binding-back consisting of a narrow rectangular box with an open front, the parts composing which are permanently secured together for holding the index-leaves and providing for their vertical adjustment.

3. The combination, with a pack of sheets or index-leaves, held at one end in a holder or file, of a holder or file having sides which prevent them from being displaced, and a swinging spring, S, attached to said holder or file, so as to bear upon the free ends of said sheets to hold them, or swing away to release them, substantially as described.

4. The combination of the swinging spring S with the holder, provided with vertical recesses, as 6, and the removable binding-back D, substantially as described.

5. The combination of the swinging spring T with the cover B, the holder A, and the index-leaves, substantially as described.

6. The binding-back D, consisting of plates *m n u*, permanently connected together, and rods *t*, secured thereto, substantially as described.

7. An associated pack of index-leaves having its outside leaf provided with the binding cord or band *c*, the free ends of which are temporarily attached thereto and adapted for operation, substantially as described.

8. The combination of cover B, having a spring, R, attached thereto, with index-leaves and holder A, substantially as described.

9. The combination of cover B, having a spring, R, attached thereto, with index-leaves, supporting-rods *t*, and holder A, substantially as described.

In testimony whereof we have signed our names to this specification in the presence of two subscribing witnesses.

BLOOMFIELD BROWER.
JOHN F. ADAMS.

Witnesses:
GEO. H. GRAHAM,
H. T. MUNSON.